United States Patent

[11] 3,558,972

| [72] | Inventor | Hiroshi Arai<br>Toyota, Japan |
|---|---|---|
| [21] | Appl. No. | 824,562 |
| [22] | Filed | May 14, 1969 |
| [45] | Patented | Jan. 26, 1971 |
| [73] | Assignee | Toyota Jidosha Kogyo Kabushiki Kaisha<br>Toyota City, Aichi Prefecture, Japan<br>a corporation of Japan |
| [32] | Priority | July 31, 1968 |
| [33] | | Japan |
| [31] | | 43/54114 |

[54] EMERGENCY LIGHTING SYSTEM FOR USING AUXILIARY LIGHT SYSTEM
10 Claims, 6 Drawing Figs.

[52] U.S. Cl.................................................... 315/83,
315/77, 315/82; 340/251
[51] Int. Cl..................................................... B60q 1/04,
B60q 1/38
[50] Field of Search........................................... 315/82, 83

[56]  References Cited
UNITED STATES PATENTS

| 2,223,251 | 11/1940 | Hack............................. | 315/83 |
| 2,693,551 | 11/1954 | Hall.............................. | 315/83 |
| 2,859,382 | 11/1958 | Ellithorpe..................... | 315/83 |
| 3,309,563 | 3/1967 | McKenzie ..................... | 315/82X |
| 3,479,557 | 11/1969 | Schultz......................... | 315/82X |

*Primary Examiner*—Roy Lake
*Assistant Examiner*—C. R. Campbell
*Attorney*—Mc Glew and Toren

ABSTRACT: An emergency equipment to cope with the failure of headlamps while a motor vehicle is running comprising headlamps connected to a power source through a main switch and a dimmer switch, a logical circuit connected to circuits of the headlamps, and auxiliary lights connected to the power source through a relay. The emergency equipment is characterized in that when one or all of the headlamps fail while the main switch is closed, the logical circuit and hence the relay are operated, whereby the auxiliary lights are turned on.

EMERGENCY LIGHTING SYSTEM FOR USING AUXILIARY LIGHT SYSTEM

The present invention relates to emergency equipment for disconnection headlamps circuits. In particular, the invention is concerned with an emergency equipment for automatically turning on auxiliary lamps, such as vehicle width indication lamps and turn signal lamps, when headlamps fail while a motor vehicle is running, in order to ensure that no accidents are caused by the failure of headlamps.

The failure of headlamps or a motor vehicle while running involves a danger both to the driver of the particular motor vehicle and drivers of the other motor vehicles passing by said vehicle, even if the failure lasts for a short interval of time.

Accordingly, it is an object of the present invention to provide an emergency equipment to cope with the failure of headlamps that may occur while a motor vehicle is running so as to ensure the safety of travel by motor vehicles.

Another object of the invention is to provide an emergency equipment which permits to detect by an electronic circuit the failure of headlamps of a motor vehicle which may be caused by the melting of a fuse or the burnout of the lamps while the motor vehicle is running and automatically turn on or switch on and off alternately vehicle width indication lamps or turn signal lamps by an output detected by the electronic circuit so as to indicate the width of the particular motor vehicle to motor vehicles running in the opposite direction and warn motor vehicles running in the same direction and following the particular motor vehicle of the occurrence of an abnormal condition, while at the same time providing for illumination of the field of view ahead so as to enable immediate stopping of the vehicle on the road side. The emergency equipment according to this invention offers the advantage of positively preventing accidents that may be caused by the failure of headlamps.

Other objects as well as advantages and features of the invention will become apparent from the description set forth hereinafter when considered in conjunction with the accompanying drawings, in which.

Embodiments of the invention will now be explained with reference to the drawings.

Figure 1:
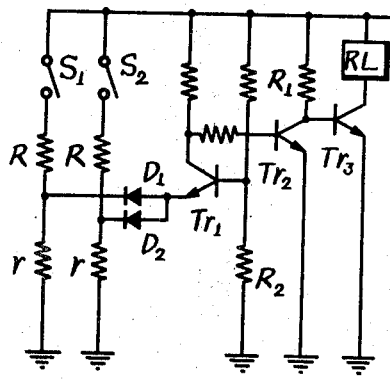
FIG. 1 is a schematic wiring diagram explanatory of the principles of the emergency equipment to cope with the failure of headlamps according to this invention.

FIG. 1 is a theoretical circuit diagram of a detection circuit comprising in combination diodes $D_1$ and $D_2$ and transistors $Tr_1$ and $Tr_3$.

The circuit of FIG. 1 operates as follows: Upon closing of switches $S_1$ and $S_2$ a current is passed through a circuit comprising the switch $S_1$, a resistor $R$ and a resistor $r$ and a circuit comprising the switch $S_2$, a resistor $R$ and a resistor $r$. Therefore, the potential $V_D$ of the cathodes of diodes $D_1$ and $D_2$ can be expressed by the following formula:

$$V_D = \frac{rE}{R+r}$$

where E is the voltage of the power source. If the potential $V_B$ of the base of the transistor $Tr_1$ which can be expressed by $$V_B = \frac{R_2 E}{R_1 + R_2}$$

is is selected beforehand such that $V_B < V_D$ a base current will not flow through the transistor $Tr_1$ so that the transistor $Tr_1$ is turned off, because the diodes $D_1$ and $D_2$ are not fired. Accordingly, the potential of the collector of the transistor $Tr_1$ tends to become equal to the voltage $E$ of the power source, so that a base current flows through a transistor $Tr_2$ to turn it on. Since the potential of the collector of the transistor $Tr_2$ is substantially zero at this time, no base current flows through a transistor $Tr_3$ which remains in an off position, so that a relay RL connected to the collector of the transistor $Tr_3$ remains inoperative.

If either one or both of the switches $S_1$ and $S_2$ are opened when the circuit elements are in this state, the potential of the cathode of the diode $D_1$ or $D_2$ or the cathodes of the diodes $D_1$ and $D_2$ will tend to become zero, with a result that the potential $V_B$ of the base of the transistor $Tr_1$ becomes higher than the potential $V_D$ of the cathodes of diodes $D_1$ and $D_2$ or $V_B > V_D$. This causes a base current to flow through the transistor $Tr_1$ to turn it on. Accordingly, the potential of the collector of the transistor $Tr_1$ will become substantially zero if the value of the resistor $r$ is low enough, with a result that the transistor $Tr_2$ is brought to an off position. This turns the transistor $Tr_3$ on and actuates the relay RL. The aforestated operation forms the basis of the present equipment and can be summarized as follows:

| Switch $S_1$ | Switch $S_2$ | Relay RL |
|---|---|---|
| ON | ON | OFF. |
| ON | OFF | ON. |
| OFF | ON | ON. |
| OFF | OFF | ON. |

Figure 2:
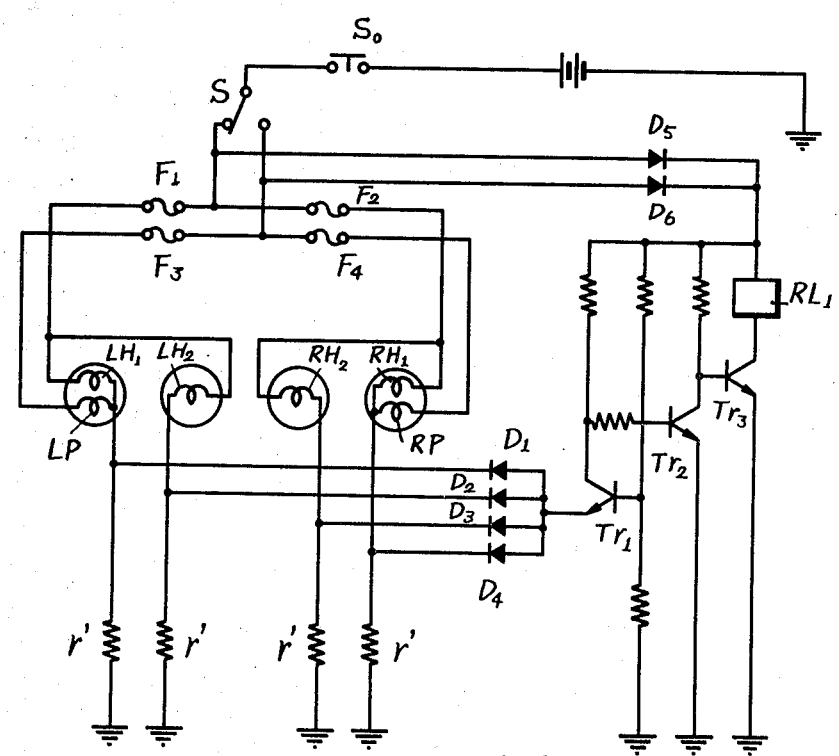
FIGS. 2 and 3 are schematic wiring diagrams of detection circuits of this invention.

FIG. 2 shows an embodiment of the circuit for detecting the failure of headlamps based on the aforementioned principles. The embodiment shown is a four-head lamp system in which $S_0$ is a main switch and S is a switch for changing over from a main beam to a pass beam, the switch S being on the main beam side as illustrated. $LH_1$ and $LH_2$ designate filaments of the left main beam lights and $RH_1$ and $RH_2$ are filaments of the right main beam lights. LP is a filament of the left pass beam light and RP is a filament of the right pass beam light. $F_1$ is a fuse of the circuit of the left main beam lights, $F_2$ is a fuse of the circuit of the right main beam lights, $F_3$ is a fuse of the circuit of the left pass beam light and $F_4$ is a fuse of the circuit of the right pass beam light. $r'$ are resistors which are distributing resistors of the headlamps circuits and are not essential to the present equipment because they are replaced by resistances of lead wires. If the theoretical circuit comprising diodes $D_1$ through $D_4$ and transistor $Tr_1$ and $Tr_3$ as shown in FIG. 1 is connected to this circuit, the relay RL will be operated in the manner described with reference to FIG. 1.

More specifically, if none of the fuses $F_1$ and $F_2$ of the right and left main beam circuits, the filaments $LH_1$ and $LH_2$ of the left main beam lights and the filaments $RH_1$ and $RH_2$ of the right main beam lights are out of order when the switch S is on the main beam side, the relay RL will remain inoperative. If any of the fuses and filaments described above are damaged, the relay RL will be actuated and detects the failure.

If none of the fuses $F_3$ and $F_4$ and none of the filaments LP and RP of the left and right pass beam lights are out of order, the relay RL will remain inoperative. But, if any of the fuses and filaments described above are damaged, the relay RL will be actuated and detect the failure in the same manner as the actuation of the relay described previously. Diodes $D_5$ and $D_6$ perform the function of separating the main beam circuits from the pass beam circuits.

Figure 3:
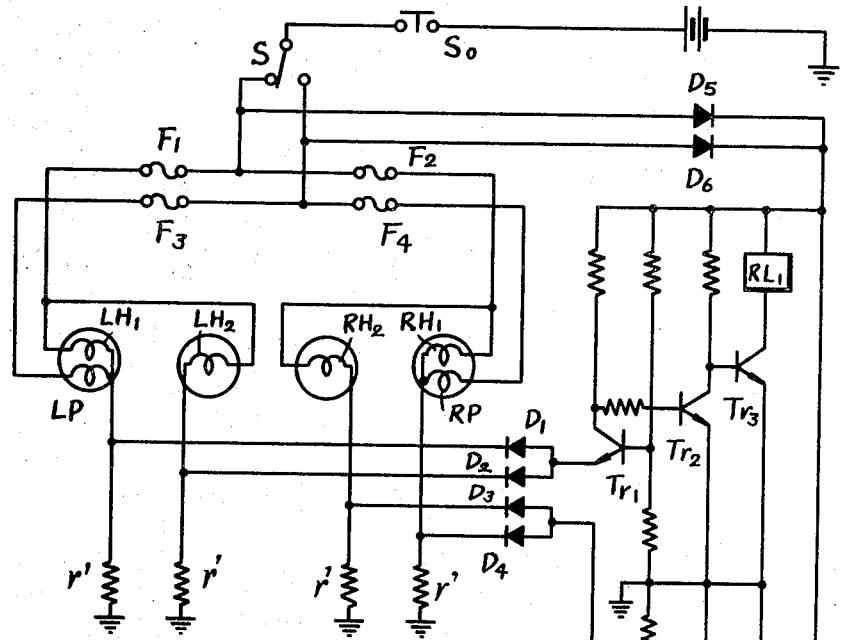

FIG. 3 shows an embodiment of the circuit for detecting the failure of the right headlamps circuit and the left headlamps circuit independently of each other. In this embodiment, the diodes $D_1$ and $D_2$ detect a failure in the left headlamps circuit and the diodes $D_3$ and $D_4$ detect a failure in the right headlamp circuit. The circuit of FIG. 3 consists of a combination of two detection circuits of FIG. 2 and uses two relays $RL_1$ and $RL_2$. The operation of the circuit shown in FIG. 3 is similar to that of the circuit shown in FIG. 2, so that the description thereof is omitted. The advantage of the circuit of FIG. 3 lies in the fact that the failure of the left headlamp circuit or the right headlamp circuit can be detected independently of each other.

Figure 4A:
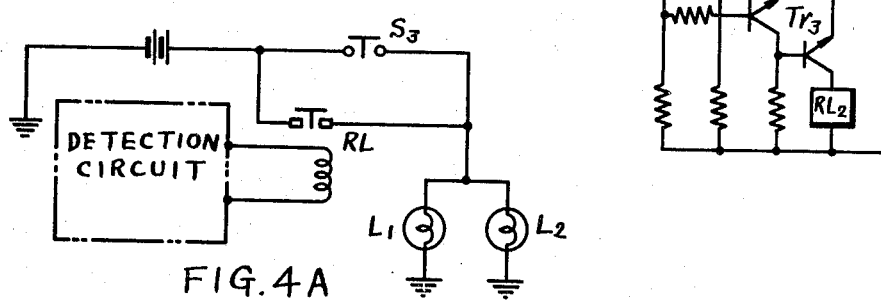
Figure 4B:
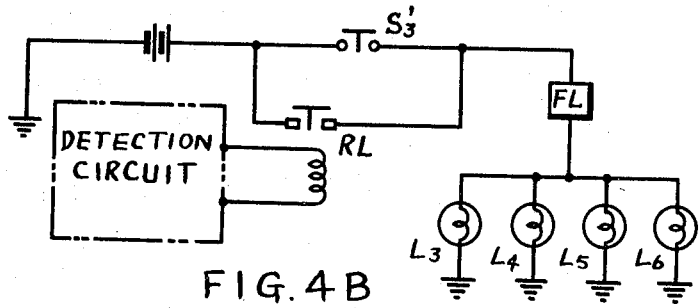

FIGS. 4A and 4B show embodiments of the circuit for controlling vehicle width indication lamps or turn signal lamps by an output detected by the circuits of FIG. 2. FIG. 4A shows an embodiment which turns on front vehicle width indication lamps upon actuation of the relay RL. $L_1$ and $L_2$ are left and right vehicle width indication lamps and $S_3$ is a manual vehicle width indication lamp switch. The embodiment shown operates such that if any one of the headlamps is turned off by some failure, the left and right vehicle width indication lamps are immediately turned on to provide illumination to a certain degree in the field of view ahead. FIG. 4B shows an embodiment which turns on hazard warning lamps. $L_3$ to $L_6$ designate hazard warning lamps on the front right, front left, rear right and rear left sides of the vehicle, $S_3'$ is a manual switch, and FL is a flash unit which is not described in detail herein because it does not form a part of this invention. This embodiment also operates such that the hazard warning will be immediately switched on and off if any one of the headlamps is turned off by some failure, thereby giving warning to motor vehicles moving in the opposite direction and moving in the same direction and following the particular motor vehicle and at the same time providing for illumination of the field of view ahead.

Figure 5:
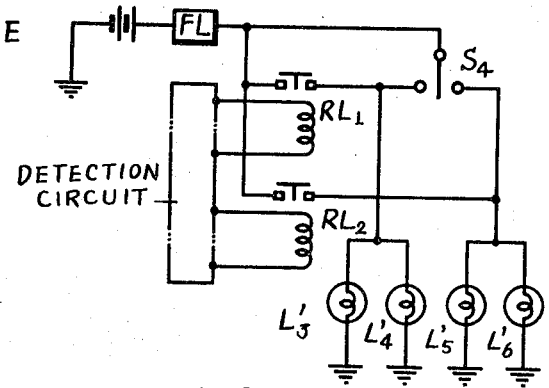
FIGS. 4A, 4B and 5 are schematic wiring diagrams of control circuits of this invention for vehicle width indication lamps and turn signal lamps.

FIG. 5 shows an embodiment of the circuit for individually controlling the turn signal lamps by an output detected by the circuit shown in FIG. 3. $L_3'$ and $L_4'$ are a left front turn signal lamp and a left rear indication lamp respectively; $L_5'$ and $L_6'$ are a right front turn signal lamp and a right rear indication lamp respectively; and $S_4$ is a manual switch for the turn signal lamps. This embodiment operates such that the relay $RL_1$ is actuated to turn on the left turn signal lamps when the left headlamps are turned off because of a failure in the left headlamp circuit and the relay $RL_2$ is actuated to turn on the right turn signal lamps when the right headlamps are turned off, thereby giving warning to motor vehicles moving in the opposite direction and moving in the same direction and following the particular motor vehicle and at the same time providing for illumination of the field of view ahead.

From the foregoing description, it will be appreciated that the present invention provides means whereby the failure of the headlamps is detected by an electronic circuit and a relay or relays are actuated by an output detected by said circuit, thereby automatically turning on or switching on and off alternately the auxiliary lights. The invention offers the advantages of permitting to continuously indicate the vehicle width to motor vehicles moving in the opposite direction and to give warning to motor vehicles moving in the same direction and following the particular motor vehicle when any one of or all the headlamps fail. The invention also permits to readily stop the vehicle on the roadside when the failure occurs. The invention can thus achieve superb results in preventing accidents due to the failure of headlamps.

I claim:

1. An emergency lighting arrangement for coping with headlamp failure of an automotive vehicle equipped with right and left headlamps, right and left auxiliary lamps, a source of DC potential and headlamp switch means controlling connection of the headlamp to one polarity terminal of the source of potential, all the headlamps having corresponding one polarity terminals connected to the switch means and corresponding opposite polarity terminals connected to the opposite polarity terminal of the source, said emergency lighting arrangement comprising, in combination, a logic circuit connected to the circuits of said headlamps and including a number of diodes equal to the number of headlamps, each diode having its corresponding polarity terminal connected to said opposite polarity terminal of a respective headlamp; relay means connected to said source through said switch means and operable to connect said auxiliary lamps in circuit with said source; and transistor means connected to said source through said switch means, to said relay means, and to the other terminals of said diodes; each diode, responsive to interruption of current flow through its associated headlamp when said switch means is closed, triggering said transistor means to a state operating said relay means to energize at least those auxiliary lamps on the same side of the vehicle as its associated headlamp.

2. An emergency lighting arrangement, as claimed in claim 1, in which said opposite polarity terminals of said headlamps and of said source are grounded; each diode having its corresponding polarity terminal connected to the grounded terminal of the respective headlamp.

3. An emergency lighting arrangement, as claimed in claim 2, including a respective resistor connecting each headlamp to ground; the corresponding polarity terminal of the associated diode being connected to the ungrounded terminal of the associated resistor.

4. An emergency lighting arrangement, as claimed in claim 2, in which the negative terminal of said source is grounded; the cathode of each diode being connected to the grounded terminal of the associated headlamp, and said transistor means being connected to the anodes of said diodes.

5. An emergency lighting arrangement, as claimed in claim 4, including a respective resistor connecting each headlamp to ground; the cathode of the associated diode being connected to the ungrounded terminal of the associated resistor.

6. An emergency lighting arrangement, as claimed in claim 1, in which said headlamps include, for each side of the vehicle, a main beam headlamp and a passing beam headlamp, said switch means including a main headlamp switch connected to said source and a dimmer switch connected between said main headlamp switch and said headlamps and selectively operable to energize either said main beam headlamps or said passing beam headlamps.

7. An emergency lighting arrangement, as claimed in claim 1, in which said logic circuit includes a first set of diodes operably associated with the headlamps on one side of the vehicle and a second set of diodes operatively associated with the headlamps on the other side of the vehicle; said relay means including a first relay means controlling the the auxiliary lamps on one side of the vehicle and a second relay means controlling the auxiliary lamps on the other side of the vehicle; said transistor means including first transistor means controlling operation of said first relay means and second transistor means controlling operation of said second relay means, each of said first and second transistor means being operatively connected to each of said first and second sets of diodes, respectively.

8. An emergency lighting arrangement, as claimed in claim 1, in which said auxiliary lamps are vehicle width indication lamps; a manually operable switch connected to said source and selectively operable to energize said indication lamps; and a second switch, operable by said relay means, connected in parallel with said manually operable switch.

9. An emergency lighting arrangement, as claimed in claim 1, in which said auxiliary lamps are hazard warning lamps; a hazard warning switch and a flasher connected in series with each other between said source and said hazard warning lamps and controlling n energization of said hazard warning a lamps; and a second switch, operable by said relay means, connected in parallel with said hazard warning switch.

10. An emergency light arrangement, as claimed in claim 7, in which said auxiliary lamps are turn signal lamps; a flasher and a turn signal switch connected in series with each other between said source and said turn signal lamps; and first and second switches connected in parallel with said turn signal switch, and each operable by a respective one of said first and second relay means.